US 6,841,285 B2

(12) United States Patent
Wilkinson et al.

(10) Patent No.: US 6,841,285 B2
(45) Date of Patent: Jan. 11, 2005

(54) IMPREGNATION OF ION-EXCHANGE MEMBRANES TO IMPROVE ELECTROCHEMICAL FUEL CELL PERFORMANCE

(75) Inventors: David P. Wilkinson, North Vancouver (CA); Joy A. Roberts, Coquitlam (CA); Nengyou Jia, Richmond (CA); Eagranie Yuh, Vancouver (CA); Shanna D. Knights, Burnaby (CA); Jean St-Pierre, Vancouver (CA)

(73) Assignee: Ballard Power Systems Inc., Burnaby (CA)

( * ) Notice: Subject to any disclaimer, the term of this patent is extended or adjusted under 35 U.S.C. 154(b) by 316 days.

(21) Appl. No.: 10/230,953

(22) Filed: Aug. 28, 2002

(65) Prior Publication Data

US 2004/0043271 A1 Mar. 4, 2004

(51) Int. Cl.[7] .............................. H01M 8/10; C08J 5/22
(52) U.S. Cl. ............................. 429/33; 521/27; 521/32; 429/13; 429/315; 429/316
(58) Field of Search ............................ 429/33, 13, 315, 429/316; 521/27, 31

(56) References Cited

U.S. PATENT DOCUMENTS

| | | | |
|---|---|---|---|
| 3,684,747 A | | 8/1972 | Coalson et al. .......... 260/2.5 R |
| 4,376,030 A | * | 3/1983 | Ezzell et al. ................. 204/296 |
| 4,414,280 A | * | 11/1983 | Silva et al. .................. 428/422 |
| 4,535,112 A | * | 8/1985 | McCain et al. ............. 524/233 |
| 4,595,476 A | * | 6/1986 | Bissot ......................... 204/252 |
| 6,306,536 B1 | * | 10/2001 | Wilkinson et al. ............ 429/33 |

OTHER PUBLICATIONS

Gebel, G. et al., Swelling Study of PerfluorosulphonatedIonomer Membranes, *Polymer*, 34(2):333–339, 1993.
Aldebert, P. et al., "Ionic Conductivity of Bulk, Gels and Solutions of Perfluorinated Ionomer Membranes," *Polymer Journal*, 23(5):399–406, 1991.
Kimmerle, F. et al., "$SO_2$ Diffusion Through Acetonitrille–Saturated Perfluorosulfonic Acid Membranes," *Canadian J. of Chemistry*, vol. 58, pp. 2225–2229, 1980.
Doyle, M. et al., "High–Temperature Proton Conducting Membranes Based on Perfluorinated Ionomer Membrane–Ionic Liquid Composites," *J. of the Electrochemical Soc.*, 147(1)34–37, 2000.
Kreuer, K. et al., "Imidazole and Pyrazole–Based Proton Conducting Polymers and Liquids," *Electrochimica Acta*, 43(10/11)1281–1288, 1998.
Yang, C. et al., "Approaches and Technical Challenges to High Temperature Operation of Proton Exchange Membrane Fuel Cells," *J. of Power Sources*, vol. 103, pp. 1–9, 2001.

* cited by examiner

*Primary Examiner*—Patrick Ryan
*Assistant Examiner*—Tracy Dove
(74) *Attorney, Agent, or Firm*—Seed IP Law Group PLLC

(57) ABSTRACT

The electrochemical performance of an ion-exchange membrane in a fuel cell system may be improved by impregnating therein a perfluoroamine. The amine may be primary, secondary or tertiary. Further, the amine is preferably water insoluble or only slightly water soluble. For example, the amine may be perfluorotriamylamine or perfluorotributylamine. Use of such a membrane system within a fuel cell may allow high or low temperature operation (i.e. at temperatures greater than 100° C. or less than 0° C.) as well as operation at low relative humidity.

19 Claims, 6 Drawing Sheets

$P_1 > P_2$ $P_1 > P_2$
$P_1 \sim P_2$

IMPREGNATION OF ION-EXCHANGE MEMBRANES TO IMPROVE ELECTROCHEMICAL FUEL CELL PERFORMANCE

BACKGROUND OF THE INVENTION

1. Field of the Invention

The present invention relates to ion-exchange membranes for electrochemical fuel cells. More particularly, the invention improves electrochemical fuel cell performance by impregnation of the ion-exchange membrane.

2. Description of the Related Art

Electrochemical fuel cells convert reactants, namely fuel and oxidant streams, to generate electric power and reaction products. Electrochemical fuel cells generally employ an electrolyte disposed between two electrodes namely a cathode and an anode. An electrocatalyst is needed to induce the desired electrochemical reactions at the electrodes. In addition to electrocatalyst, the electrodes may also comprise an electrically conductive substrate upon which the electrocatalyst is deposited. The electrocatalyst may be a metal black (namely, a substantively pure, unsupported, finely divided metal or metal powder) an alloy or a supported metal catalyst, for example, platinum on carbon particles.

A solid polymer fuel cell is a type of electrochemical fuel cell which employs a membrane electrode assembly ("MEA"). The MEA comprises a solid polymer electrolyte or ion-exchange membrane disposed between the two electrode layers. The ion-exchange membranes of particular interest are those prepared from fluoropolymers and which contain pendant sulfonic acid functional groups and/or carboxylic acid functional groups. A typical perfluorosulfonic acid/PTFE copolymer membrane can be obtained from DuPont Inc under the trade designation Nafion®.

A broad range of reactants can be used in electrochemical fuel cell. For example, the fuel stream may be substantially pure hydrogen gas, a gaseous hydrogen-containing reformate stream, or methanol in a direct methanol fuel cell. The oxidant may be substantially pure oxygen or a dilute oxygen stream such as air.

The electrochemical oxidation which occurs at the anode electrocatalyst of a solid polymer electrochemical fuel cell, results in the generation of cationic species, typically protons. The cations must then cross the membrane to the cathode electrocatalyst where reaction with the oxidant generates water thereby completing the electrochemistry. Typically, transport of cations across the membrane is assisted by water molecules in the membrane. Humidification of the membrane thus improves fuel cell performance.

One method of increasing the electrical conductivity of the membrane is disclosed in U.S. Pat. No. 3,684,747 in which a swelling agent is used to increase the liquid absorptive capacity of the polymer. An increase in the absorption of aqueous electrolyte by the polymer increases the electrical conductivity of the polymer.

Unfortunately, conductivity suffers at higher temperatures, particularly over 100° C. where there is reduced water absorption. As the vapor pressure of water increases rapidly with temperature, it becomes much more difficult to operate at higher temperatures. There is also a general desire to operate under low relative humidity conditions even at normal operating temperatures. Various approaches have been undertaken to improve fuel cell performance under high temperature—low humidity conditions such as, for example, phosphoric acid doped membranes. However, acid doped membranes tend to have a high degradation rate with corrosion of cell components. High temperature operation has been observed with membranes swollen with ionic liquids, such as 1-butyl, 3-methyl imidazolium trifluoromethane sulfonate (BMITf) and 1-butyl, 3-methyl imidazolium tetrafluoroborate (BMIBF$_4$). However, BMITf and BMIBF$_4$ are highly toxic compounds that may leach out of the fuel cell during operation.

Generally, amines have been considered to be either non-conductive or have only a low proton conductivity. An exception noted by K. D. Kreuer et al., *Electrochimica Acta* 43(10–11):1281, 1998, involves imidazole and pyrazole in which relatively high proton conductivity has been observed in sulfonated polyetherketo-membrane systems. Both imidazole and pyrazole are heterocycles with the following structures:

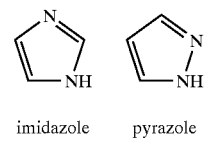

imidazole    pyrazole

K. D. Kreuer et al. attributed the high conductivity to imidazole and pyrazole each having a non-polar ring and both protonated and unprotonated nitrogen functionality. Thus imidazole and pyrazole may act as both hydrogen donors and acceptors in proton conduction processes. While these compounds may show increased conductivity within membrane systems, it is unlikely that they are suitable for use within the fuel cell environment. For example, a recent study by C. Yang et al., *Journal of Power Sources* 103:1, 2001, reports that imidazole impregnated membranes poisoned the catalysts.

There continues to be a need for membrane additives that improve electrochemical performance and are suitable for use within the fuel cell environment.

BRIEF SUMMARY OF THE INVENTION

An ion-exchange membrane for use with an electrochemical fuel cell may be impregnated with a perfluoroamine. The perfluoroamine may be primary, secondary or tertiary.

In a preferred embodiment, the perfluoroamine is substantially water insoluble. Examples of suitable amines for impregnation within the ion-exchange membrane include tertiary perfluoroamines such as perfluorotriamylamine and perfluorotributylamine.

Greater amounts of perfluoroamine are expected to improve the membrane performance, particularly if the amine is in an amount greater than 1% by weight of the membrane. In a preferred embodiment, the amine is in an amount greater than 6% by weight, for example about 9% by weight.

A method of improving electrochemical fuel cell performance, the method comprising:

(a) impregnating a perfluoroamine into an ion-exchange membrane, the perfluoroamine being primary, secondary or tertiary;

(b) assembling the ion-exchange membrane into a fuel cell; and (c) operating the fuel cell.

Impregnation of the perfluoroamine into the membrane improves operation of the fuel cell under all operating conditions though particularly at high temperatures and low humidity. For example, the temperature at which the fuel cell is operated may be greater than 100° C. Further, impregnation of the membrane also improves operation of the fuel cell at low temperatures below 0° C. In addition, the fuel cell may be operated under low relative humidity conditions, even as low as 0% relative humidity.

Impregnation of the perfluoroamine into the membrane may be performed by contacting the membrane with a solution of the perfluoroamine. The impregnation may be improved by minimal agitation of the perfluoroamine solution, dessicating the membrane prior to contact, and/or impregnating at room temperature.

BRIEF DESCRIPTION OF THE SEVERAL VIEWS OF THE DRAWING(S)

DETAILED DESCRIPTION OF THE INVENTION

Figure 1:
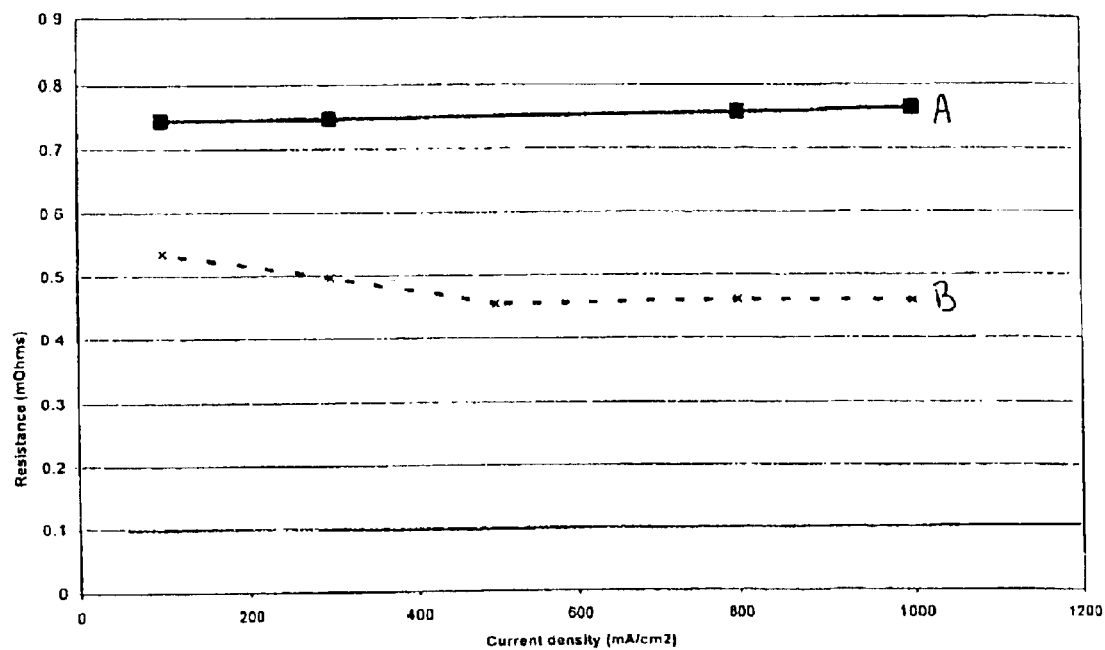
FIG. 1 is a graph of resistance against current density comparing an ion-exchange membrane treated with perfluorotriamylamine against an untreated membrane.

FIG. 1 is a graph of resistance against current density comparing a membrane impregnated with perfluorotriamylamine against an untreated membrane. The structure of perfluorotriamylamine is as follows: $(CF_3CF_2CF_2CF_2CF_2)_3N$.

The membranes used were Nafion® membranes provided by DuPont Inc. "A" refers to untreated Nafion® 112 membrane measured at 105° C. whereas "B" refers to Nafion® 112 membrane impregnated with perfluorotriamylamine measured at 110° C. The treatment consisted of soaking the membrane in the neat perfluorotriamylamine solvent for one hour at 80° C. The membranes were bonded into membrane electrode assemblies (MEAs) and tested in-situ with the resistance measured at the bus plates.

Even though amines are not traditionally considered to be conductive, FIG. 1 illustrates a significant reduction in resistance after impregnating the membrane with perfluorotriamylamine. Furthermore, perfluorotriamylamine is suitable for use within the fuel cell environment as illustrated in FIG. 2.

Figure 2:
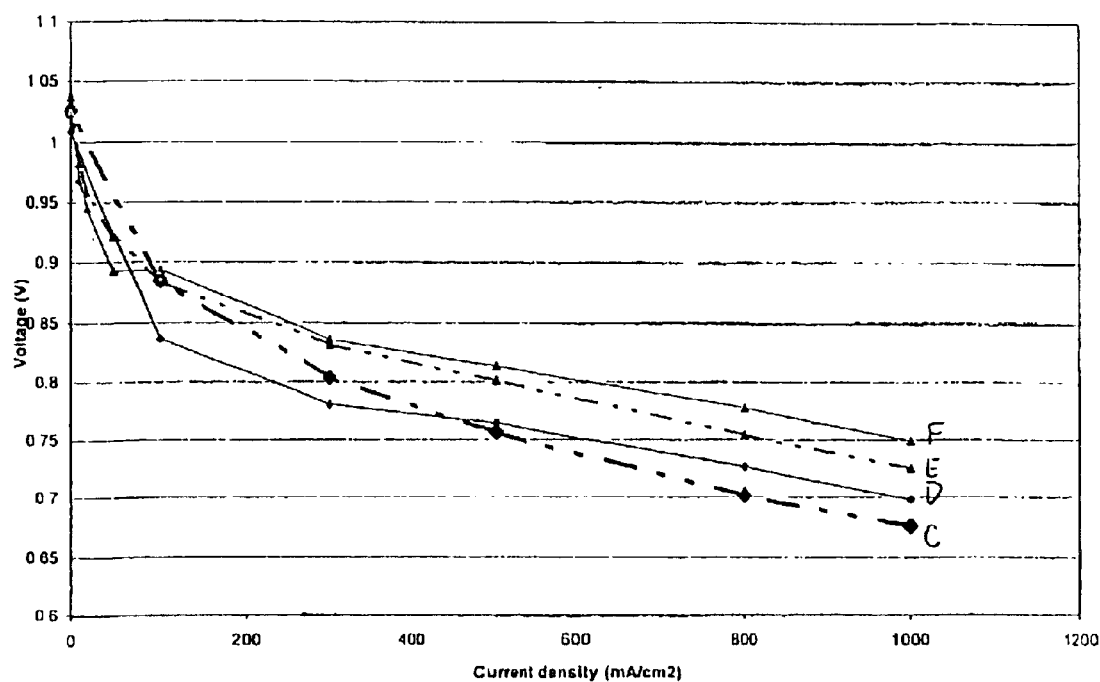
FIG. 2 is a graph of voltage against current density comparing performance of a membrane electrode assembly (MEA) comprising ion-exchange membrane treated with perfluorotriamylamine against an untreated membrane under normal operating conditions.

FIG. 2 is a graph of voltage against current density comparing performance of an MEA comprising membrane impregnated with perfluorotriamylamine against an MEA with an untreated membrane. The MEAs were prepared as discussed above in reference to FIG. 1. "C" refers to the results obtained with an untreated membrane operated under 40% oxygen as oxidant; "D" refers to the impregnated membrane operated under 40% oxygen; "E" refers to the untreated membrane operated under 100% oxygen; and "F" refers to the impregnated membrane under 100% oxygen. These results not only support the results from FIG. 1 that impregnation of a membrane with perfluorotriamylamine improves the electrochemical properties but also that such a system is compatible with the fuel cell environment. Note that the results at low current density at 40% oxygen seem to be anomalous and are inconsistent with other results not shown. Improvements in electrochemical properties are expected at all current densities.

Figure 3:
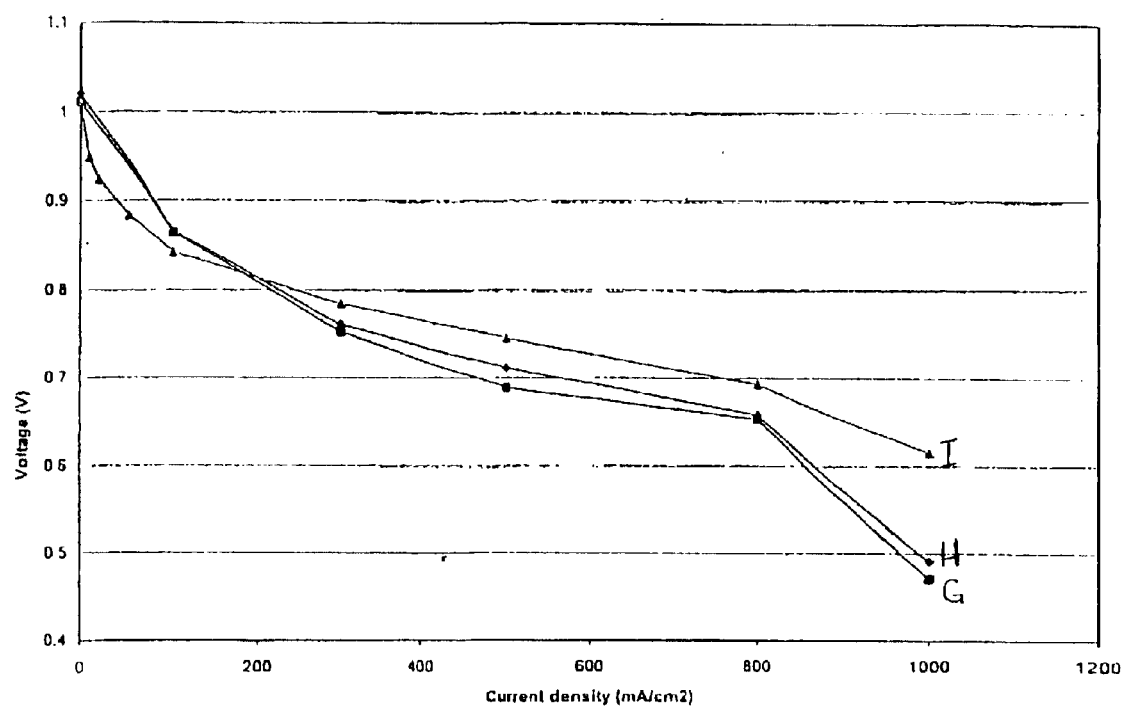
FIG. 3 is a graph of voltage against current density of an MEA comprising an ion-exchange membrane treated with perfluorotriamylamine at 130° C.

FIG. 3 is a graph of voltage against current density of an MEA comprising membrane impregnated with perfluorotriamylamine operated at 130° C. The MEAs were prepared as discussed above in reference to FIG. 1. "G" refers to the results obtained with use of a mixture of helium and oxygen as oxidant ("helox"); "H" refers to the use of air as oxidant; and "I" refers to the use of 100% oxygen as oxidant. FIG. 3 illustrates a significant improvement of the treated membrane as compared to the untreated membrane as MEAs containing untreated Nafion® 112 are unable to operate at such high temperatures. The impregnation of perfluorotriamylamine thus allows for operation of the fuel cell under high temperature/low humidity conditions not otherwise permitted. High temperature conditions are generally considered to be temperatures above 100° C.

Though not bound by theory, the lone pair of electrons available on the amine might help promote proton conduction and thereby reduce the dependency of the membrane on water for proton conduction. Thus any amine would be expected to similarly reduce the electrical resistance. Specifically the amine may be primary, secondary or tertiary.

An additional effect that may be observed is a change in the density of conductive sites within the membrane. Without being bound by theory, the non-polar solvent may swell the hydrophobic portion of the membrane thereby resulting in the sulfanate sites being packed more closely. Greater proton conduction may thus be allowed through the hydrophilic portions of the membrane as the density of the conductive sulfonate sites increases. The amine functionality would not be necessary for this additional effect as it is a function of the hydrophobicity of the impregnant and thus benefits may be observed by impregnating the membrane with other fluoroinert compounds such as, for example, perfluorooctane or perfluoroheptane. Thus the amines mentioned above, namely perfluorotributylamine and perfluorotriamylamine are only a subset of a larger group of fluoroinert compounds that can be impregnated within the membrane.

Figure 5:
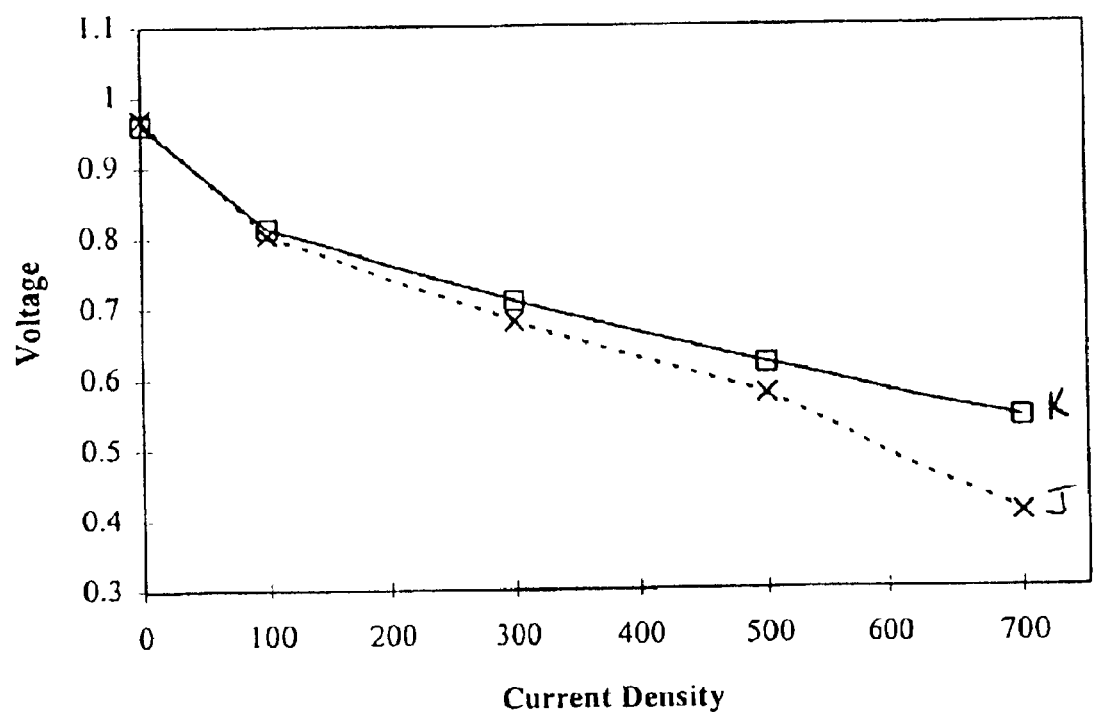
FIG. 5 is a graph of voltage against current density of an unbonded MEA wherein the catalyst layer at the cathode is coated with perfluorotributylamine.

The amines chosen above, namely perfluorotriamylamine and perfluorotributylamine have been perfluorinated so as to increase compatibility with the membrane and catalyst environments. Further, perfluorinated solvents have been known to have increased oxygen solubility which may also be beneficial in fuel cell operation. Increased oxygen solubility is also demonstrated in improved performance when perfluoroamine is applied as a thin coating on the cathode. FIG. 5 is a graph of voltage against current density of an unbonded MEA. "J" is a baseline measurement in air of the untreated and unbonded MEA. A significant improvement is observed by "K" wherein a thin coating of perfluorotributylamine has been applied to the cathode catalyst layer.

A perfluorinated tertiary amine would be of the general formula $(C_xF_{2x+1})(C_yF_{2y+1})(C_zF_{2z+1})N$ where x, y and z are between 1 and 10. A secondary amine would be of the general formula $(C_{x'}F_{2x'+1})(C_{y'}F_{2y'+1})NH$ where x' and y' are between 1 and 10. A primary amine would be of the general formula of $(C_{x''}F_{2x''+1})NH_2$ where x" is between 1 and 10. The above general formulas assume that the carbon chains are saturated though the amines may also be unsaturated or cyclic in which case the number of fluorine atoms would be reduced accordingly. The amines may also be mono or multidentate.

Leaching of the amine out of the membrane during prolonged use of the fuel cell may be a problem. Two properties of the amine can be selected so as to mitigate against this, namely steric size and water solubility. While these two properties are related in that water solubility tends to decrease with increasing steric size, the effect on leaching may be different. Amines with a relatively large steric bulk, would also be expected to have reduced mobility within the membrane environment. Thus it is expected that tertiary amines will tend to leach less over time than secondary amines, which would similarly leach less than primary amines.

In addition to steric effects, water solubility would also be expected to affect the amount of leaching observed over long-term use. Even without external humidification, water is a by-product of the fuel cell reaction and would be expected to be present. Amines that are water-soluble would therefore be more likely to leach out of the membrane along with any water produced. Thus amines that are water insoluble or only slightly soluble may be beneficial for long-term use of the fuel cell. Perfluorotriamylamine and perfluorotributylamine are both water insoluble with a relatively large steric size.

Figure 4:
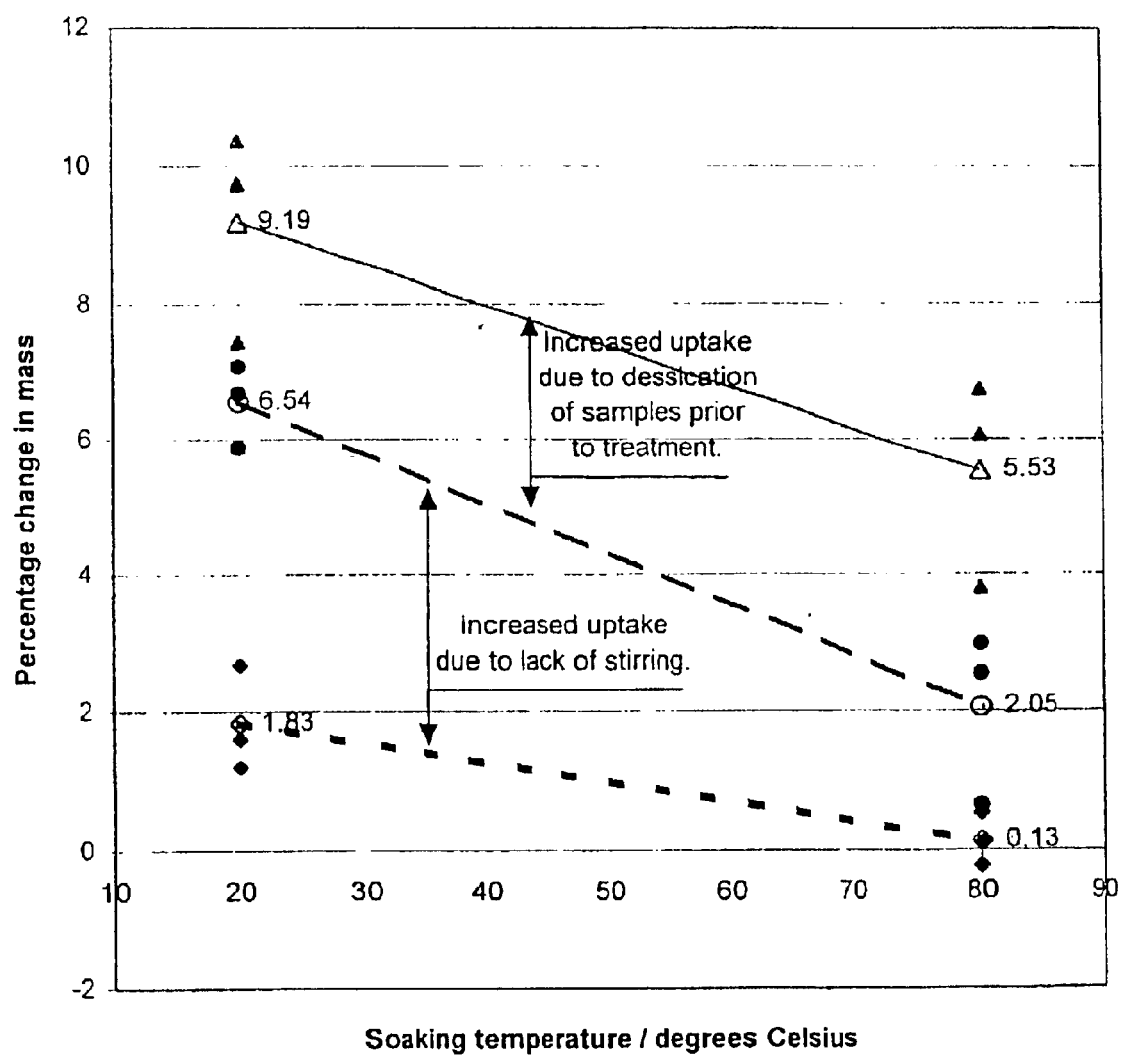
FIG. 4 is a graph of percentage change in mass of ion-exchange membrane against soaking temperature in perfluorotriamylamine under different soaking conditions.

The amount of amine impregnated should be greater than 1% by weight of the membrane. In general, greater amounts of amine impregnated into the membrane results in improved performance of the resulting fuel cell. However, the maximum amount of amine that can be impregnated into the membrane system can be affected by many factors. In FIG. 4, several of these factors are examined wherein 10×10 cm samples of Nafion® 112 were soaked in perfluorotriamylamine for 60 minutes at specified temperatures. Three measurements of the percentage change in mass were taken and averaged at two different temperatures for samples that were not dried nor dessicated prior to soaking in trifluoroamylamine with stirring of the amine (♦, ◊ for the average); samples that were not dried nor dessicated prior to soaking but without stirring of the amine (●, ○ for the average); and samples that were dried in a vacuum oven for 4 hours then left to cool in a dessicator overnight before soaking in perfluorotriamylamine without stirring (▲, ∆ for the average). For example, more perfluorotriamylamine is incorporated into the membrane at room temperature than at higher temperatures such as 80° C. Further, approximately 3% by weight more perfluorotriamylamine is observed in Nafion® 112 if water is removed by vacuum drying the membrane. Agitation of perfluorotriamylamine during the impregnation, by for example, stirring, also tends to decrease the amount of amine impregnated into the membrane by about 2 to 5% by weight. Without being bound by theory, agitation of the amine solvent may interfere with its diffusion into membrane pores. There may be other factors that affect the amount of amine impregnated into the membrane. Naturally, the amount of amine would vary according to the particular membrane system and amine. In FIG. 4, the greatest amount of perfluorotriamylamine impregnated into Nafion® 112 is about 9% by weight.

Figure 6A:
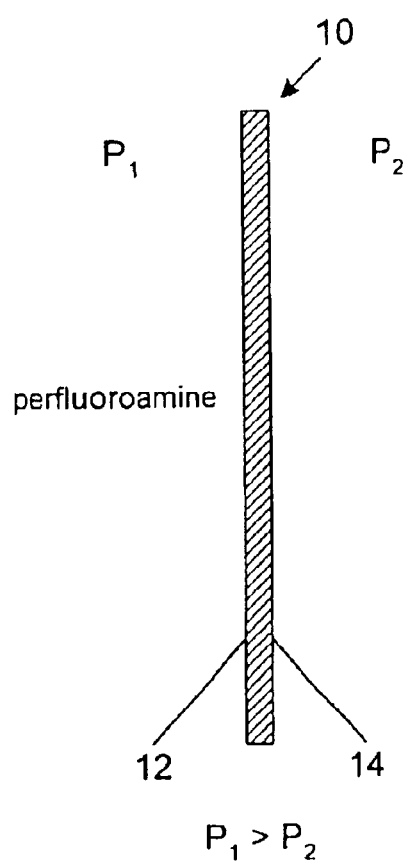
FIGS. 6A and 6B illustrates techniques for increasing impregnation of a membrane with perfluoroamine.
Figure 6B:
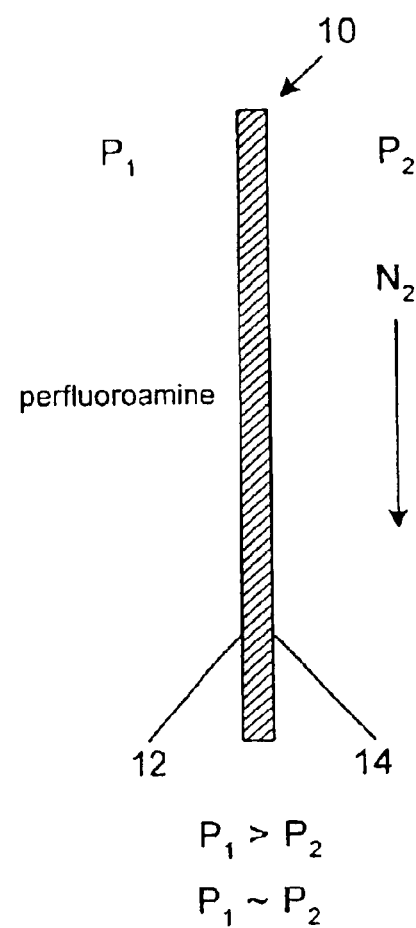

Additional steps may be made to improve impregnation of an ion exchange membrane with a perfluoroamine. For example, in FIG. 6a, side 12 of membrane 10 contacts a perfluoroamine solution at a pressure P1. A pressure differential between P1 and P2 at side 14 of membrane 10 assists in incorporating greater amounts of perfluoroamine. Also, as shown in FIG. 6b, a stream of inert gas, such as nitrogen, along side 14 helps to draw water (not shown) out of membrane 14 thereby assisting the incorporation of perfluoroamine into membrane 10. In FIG. 6b, there may or may not be a pressure differential between side 12 and side 14. Finally, if an alcohol is present along with the amine, the alcohol may cause swelling of the membrane thereby increasing the size of membrane pores. With a larger pore size, bulky perfluoroamines would be incorporated into the membrane system more readily. The alcohol should be chosen such that it is easily removed from the membrane system. Any of these additional steps may be combined or used alone to assist in the impregnation of the membrane.

An additional benefit is to reduce the amount of water absorbed by the membrane after treatment with the perfluoroamine. A Nafion® membrane was impregnated with perfluorotriamylamine as discussed above with respect to FIG. 1. This membrane and an untreated membrane were then immersed in deionized water for 35 minutes at room temperature and weighed. The treated membrane had an 11% increase in mass as compared to a 14% increase in mass for the untreated membrane. Thus, less water is absorbed by the Nafion® membrane when impregnated with the perfluoroamine than for the untreated membrane. It is anticipated that this provides greater dimensional stability to the membrane under localized or global drying conditions typically seen in a fuel cell. Thus operation of the fuel cell also improves under low relative humidity conditions. Low relative humidity is defined as less than 100% rh.

Further, under freezing conditions, any water present in the ion-exchange membrane undergoes a transition such that it may no longer be in a useful state to assist in proton conduction across the membrane. Any amine impregnated within the membrane would likely reduce the amount of water present, and, assuming the amine has a lower freezing point than water, may still be able to assist with proton conduction under low temperature conditions.

In addition to the advantages of steric size and water insolubility as mentioned above, perfluorotriamylamine and perfluorotributylamine are non-toxic, non-flammable, inert and easy to handle. However, these qualities are not necessarily required as many other amines would be expected to be useful within the fuel cell environment, even if they do not possess all of the above attributes.

While particular steps, elements, embodiments and applications of the present invention have been shown and described, it will be understood, of course, that the invention is not limited thereto since modifications may be made by persons skilled in the art, particularly in light of the foregoing teachings. It is therefore contemplated by the appended claims to cover such modifications as incorporate those steps or elements that come within the spirit and scope of the invention.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An ion-exchange membrane for an electrochemical fuel cell, the membrane comprising a perfluoroamine impregnated therein, the perfluoroamine being a primary, secondary or tertiary amine.

2. The ion-exchange membrane of claim 1 wherein the perfluoroamine is a tertiary amine.

3. The ion-exchange membrane of claim 1 wherein the perfluoroamine is substantially water insoluble.

4. The ion-exchange membrane of claim 3 wherein the perfluoroamine is perfluorotriamylamine or perfluorotributylamine.

5. The ion-exchange membrane of claim 1 wherein the amount of perfluoroamine is greater than than 1% by weight.

6. The ion-exchange membrane of claim 1 wherein the amount of perfluoroamine is greater than 6% by weight.

7. The ion-exchange membrane of claim 1 wherein the amount of perfluoroamine is about 9% by weight perfluoroamine.

8. An electrochemical fuel cell comprising the ion-exchange membrane of claim 1.

9. A method of improving electrochemical fuel cell performance, the method comprising:
   (a) impregnating a perfluoroamine into an ion-exchange membrane, the perfluoramine being a primary, secondary or tertiary amine;
   (b) assembling the ion exchange membrane into a fuel cell;
   (c) operating the fuel cell with the perfluoroamine impregnated within the membrane.

10. The method of claim 9 wherein the perfluoroamine is a tertiary amine.

11. The method of claim 10 wherein the tertiary amine is perfluorotributylamine or perfluorotriamylamine.

12. The method of claim 9 wherein the operating step is at temperatures greater than 100° C.

13. The method of claim 9 wherein the operating step is at a temperature less than 0° C.

14. The method of claim 9 wherein the operating step is at low relative humidity.

15. The method of claim 9 wherein the impregnating step comprises contacting the membrane with a perfluoroamine solution.

16. The method of claim 15 wherein the contacting step is done with minimal agitation of the perfluoroamine solution.

17. The method of claim 15 wherein the impregnating step further comprises dessicating the membrane prior to the contacting step.

18. The method of claim 9 wherein the impregnating step is at room temperature.

19. An ion-exchange membrane for an electrochemical fuel cell, the membrane comprising a fluoroinert impregnated therein, wherein the fluoroinert is selected from the group consisting of perfluoroheptane, perfluorooctane, perfluorotributylamine and perfluorotriamylamine.

* * * * *